R. J. BURHEN.
MOVABLE TOY.
APPLICATION FILED APR. 6, 1917.
1,246,540.
Patented Nov. 13, 1917.
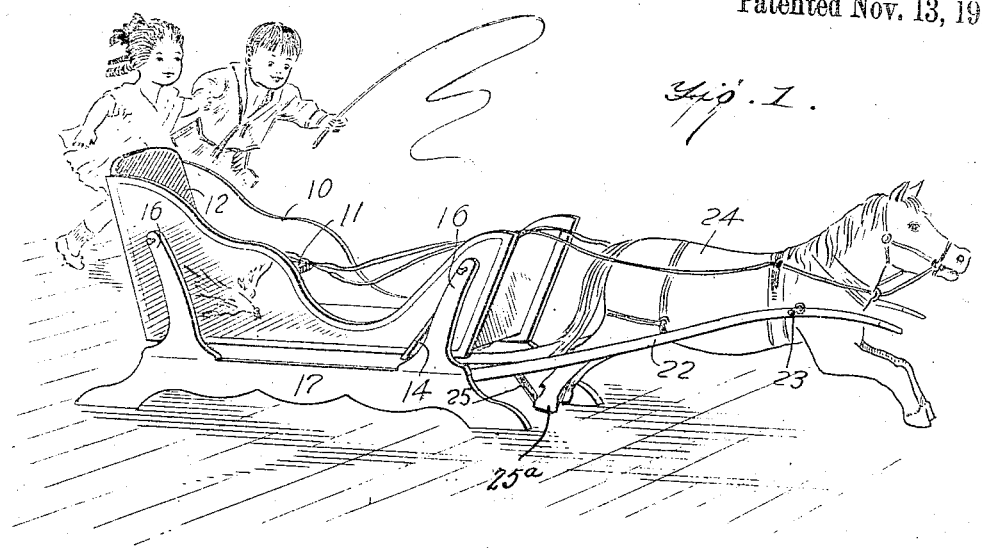
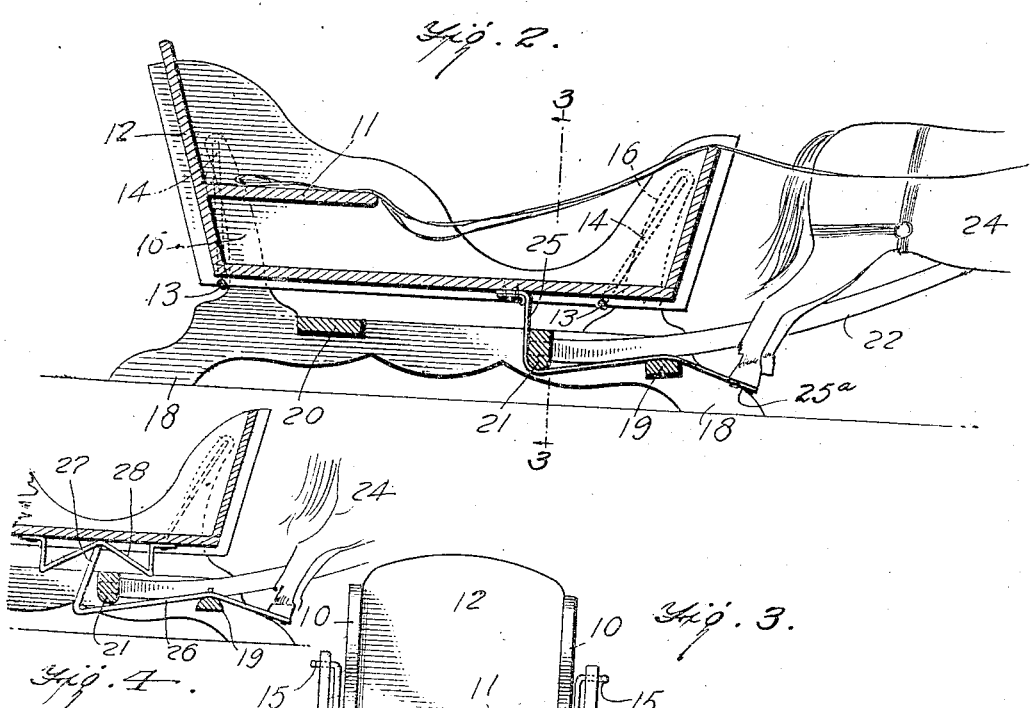
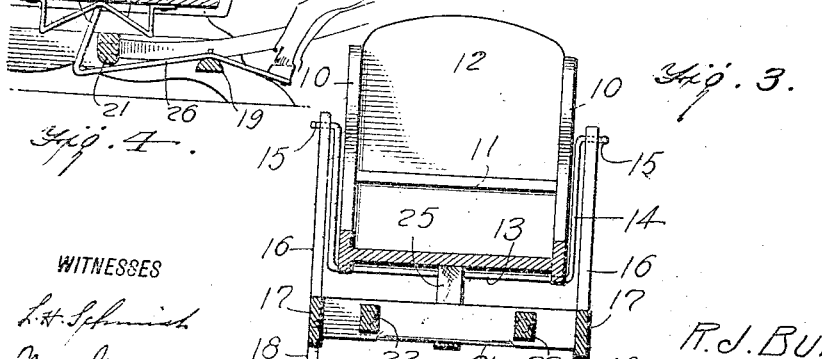
WITNESSES
INVENTOR
R. J. BURHEN,
BY
ATTORNEYS

UNITED STATES PATENT OFFICE.

REINHART JACOB BURHEN, OF ST. LOUIS, MISSOURI, ASSIGNOR TO HENRY M. BLOSSOM, OF ST. LOUIS, MISSOURI.

MOVABLE TOY.

1,246,540. Specification of Letters Patent. Patented Nov. 13, 1917.

Application filed April 6, 1917. Serial No. 160,164.

*To all whom it may concern:*

Be it known that I, REINHART J. BURHEN, a citizen of the United States, and a resident of the city of St. Louis, in the State of Missouri, have invented a certain new and useful Improvement in Movable Toys, of which the following is a specification.

My present invention relates generally to amusement devices, and more particularly to movable toys, my object being to provide a movable carriage in connection with a frame and an elevated animal at the forward portion thereof, suitably supported through connection with the frame, together with certain connections between the animal and the carriage whereby, upon swinging movement of the latter, the animal will be oscillated upon its pivot.

A further object is to provide a simple inexpensive arrangement of the above character, capable of ready repair in case of breakage and ready renewal of any of the several parts thereof, as well as one capable of lasting continuous operation for the purposes for which it is intended.

In the accompanying drawing illustrating my invention,

Figure 1 is a perspective view of the complete device;

Fig. 2 is a vertical longitudinal section through the carriage and its supporting frame, Fig. 3 is a vertical transverse section taken substantially on line 3—3 of Fig. 2, and Fig. 4 is a partial vertical longitudinal section illustrating a modified form.

Referring now to these figures, I provide a carriage generally indicated at 10, having a seat 11 and a back 12, as best seen in Fig. 2, and having its forward and rear portions disposed upon the lower central cross bars 13 of a pair of U-shaped hangers 14, the side extensions of which are provided with upper angular portions 15 journaled in the forward and rear uprights 16 of a supporting frame 17, in which the carriage 10 is, by the connections just stated, adapted to swing in the direction of its length, motion being imparted thereto by swinging movement of the bodies of the occupants.

The sides of the supporting frame 17, from the forward and rear portions of which the uprights 16 upstand, and which are provided with forward and rear feet portions 18, are connected by forward and rear cross bars 19 and 20, and by intermediate cross bar 21, to which the rear ends of forwardly and upwardly extending shafts 22 are suitably secured, the shafts resting at points intermediate their length upon the forward cross bar 19, for a purpose to be presently described.

Adjacent their forward ends, the shafts 22 support the pivots 23 of a toy animal, preferably in the form of a horse 24, the pivots of which are located forwardly beyond the center thereof, as particularly seen in Fig. 1, so that the rear portion of the toy animal will tend to move downwardly at all times of its own weight.

To the base of the carriage 10 is secured the rear end of a flexible operating connection, in the form of a strap or the like 25, passing beneath the intermediate cross bar 21 as shown in Fig. 2, and over the forward cross bar 19, and connected at its forward end to the rear portion of the toy animal 24, as for instance one of the rear feet thereof, as indicated at 25ª in Figs. 1 and 2.

Thus, it is obvious that, when the carriage 10 is swung rearwardly and the effective length of the connection 25 shortened, the rear portion of the toy animal will be elevated on its pivot 23, and when the carriage 10 is swung forwardly, the rear portion of the animal will lower of its own weight, so that in this way continuous oscillation of the animal 24 will result during swinging movement of the body 10.

A modified construction might be utilized to operate the toy animal 24 as in Fig. 4, where the forward cross bar 19 supports the intermediate pivot of an actuating lever 26, the forward end of which is secured to one of the rear feet of the toy animal and the rear end of which has an angular upstanding extension 27 the upper free end of which engages a body plate 28 attached to the lower surface of the body 10. It will be noted that the rear portion of said lever 26 extends beneath the intermediate cross bar 21 so as not to interfere with the pivotal movement of the toy animal, and that the body plate 28 has angular portions alternately engaging the angular extension 27 when the body 10 is swung to swing the lever 26 and consequently the toy animal 24.

It is apparent that, in view of the connection of the rear ends of the shafts 22 to the intermediate cross bar 21, and the intermediate support of the shaft upon the forward cross bar 19, the said shafts may be effectively supported in such manner as to hold the animal 24 in elevated position free of the surface upon which the frame 17 rests, so as to permit of freely oscillating movement of the animal.

It is obvious, furthermore, that the movements of the animal brought about in the manner described, will be highly amusing to children, and that the device as a whole will effectively fulfil the objects before stated.

I claim:—

1. A toy of the type described comprising a carriage, a frame in which the carriage is swingable in the direction of its length, shafts extending forwardly from the frame, a toy animal pivoted to the said shafts to oscillate vertically therein, connections between the shafts and the frame whereby to hold the former, with said animal, in elevated position, said animal having its pivot located forwardly of its center, and a flexible connection between the rear portion of the animal and the said swinging carriage whereby to oscillate the former upon swinging movement of the latter.

2. A toy of the type described, comprising a carriage, U-shaped hangers, upon the central cross bars of which the forward and rear portions of the carriage are disposed, and the extensions of which are provided with upper angular portions, a supporting frame comprising side portions having forward and rear uprights in which the angular portions of said hangers are journaled, and having cross bars connecting the said sides, forwardly extending shafts connected at their rear ends to one of the said cross bars and resting upon another of the cross bars, to hold the shafts in elevated position, a toy animal pivoted adjacent its forward end to the said shafts to oscillate vertically therein, and a flexible connection between the carriage and the rear of the said toy animal, and loosely engaging and guided by the said cross bars of the supporting frame.

3. A toy of the type described comprising a forwardly and rearwardly swinging carriage and having forwardly projecting shafts, a supporting frame therefor, an elevated vertically oscillatory toy animal forwardly of the frame and pivotally mounted adjacent its forward end in said shafts, and a flexible connection between the rear portion of the said toy animal and the swinging frame, for the purpose described.

4. A toy of the type described, comprising a carriage, a supporting frame in which the carriage is mounted to swing having forward and intermediate transverse cross bars extending beneath the carriage, and shafts connected to said intermediate cross bar and projecting forwardly therefrom and resting on said forward cross bar, a figure toy pivoted to the shafts, and operative connections between said carriage and said figure toy whereby to oscillate the latter by swinging movement of the former and including a member extending over the forward cross bar and beneath the rear cross bar.

REINHART JACOB BURHEN.

Copies of this patent may be obtained for five cents each, by addressing the "Commissioner of Patents, Washington, D. C."